Figure 1:
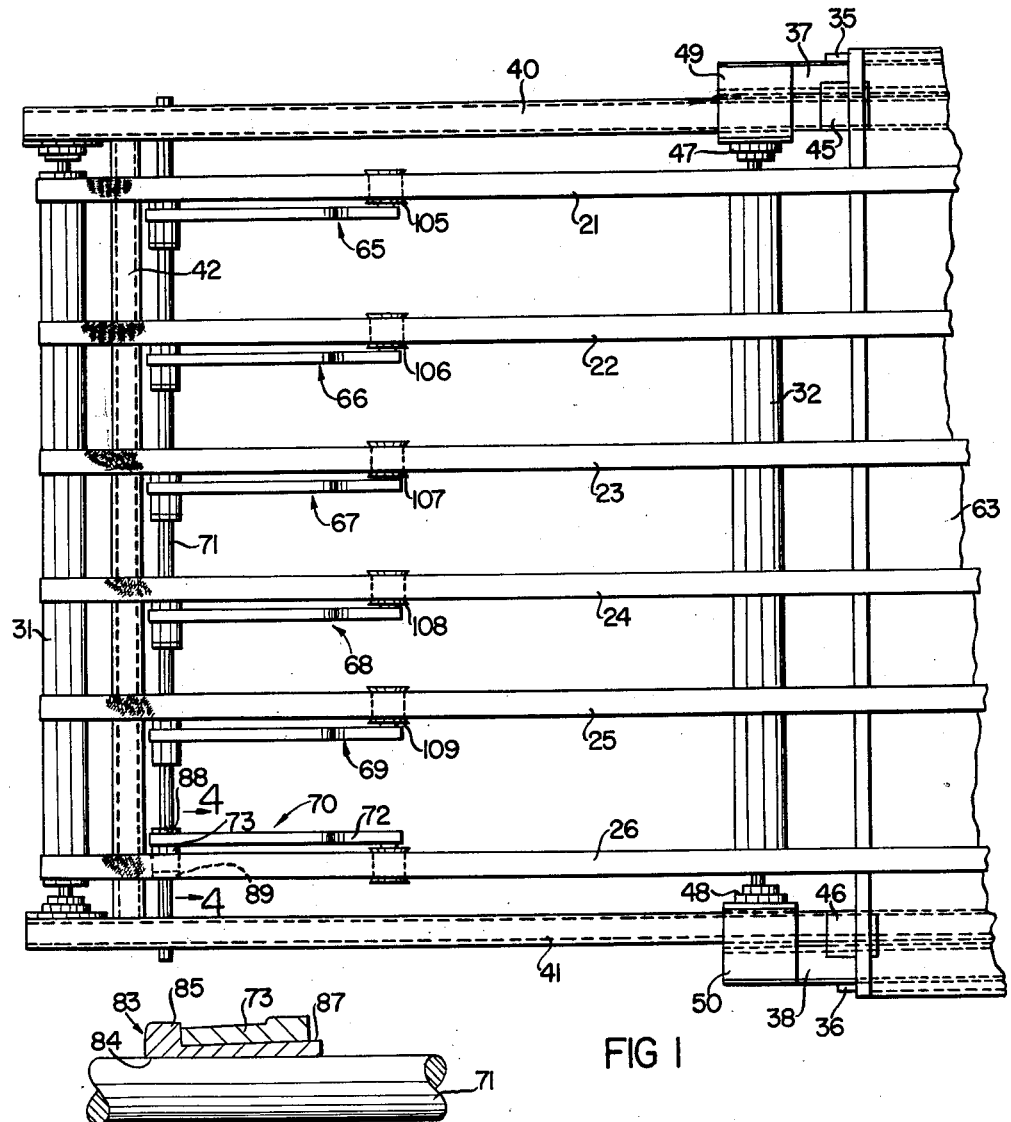

May 7, 1963 A. ROSTAL 3,088,581
CONVEYOR BELT CONTROL DEVICE
Filed April 12, 1961 2 Sheets-Sheet 1

INVENTOR.
ALFRED ROSTAL
BY
Oberlin, Maky & Donnelly
ATTORNEYS

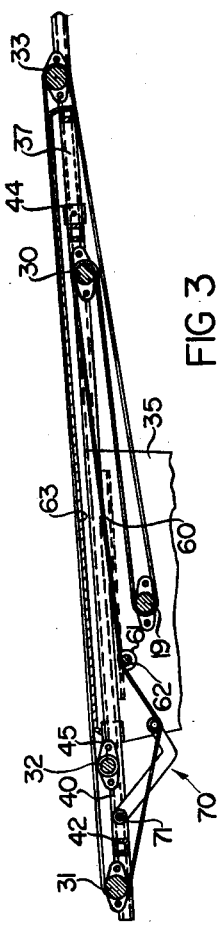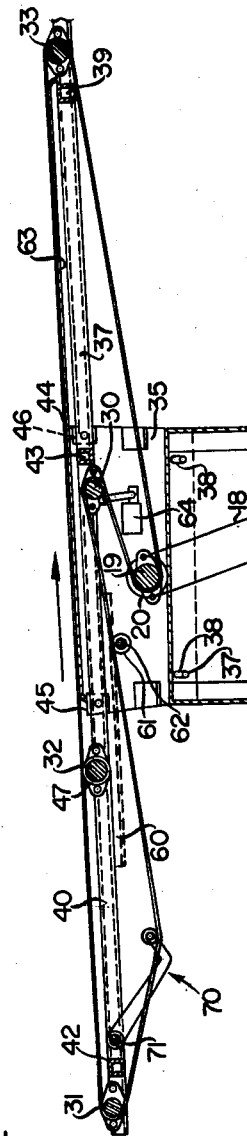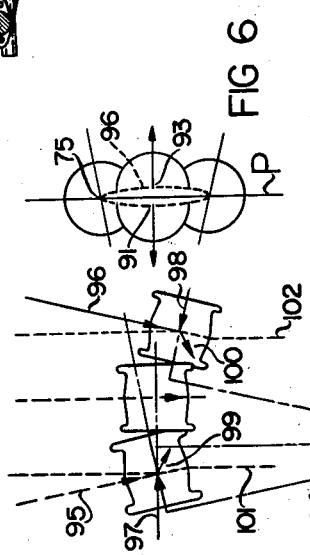
INVENTOR.
ALFRED ROSTAL
BY
Oberlin, Maky & Donnelly
ATTORNEYS United States Patent Office 3,088,581
Patented May 7, 1963

3,088,581
CONVEYOR BELT CONTROL DEVICE
Alfred Rostal, Olmsted Falls, Ohio, assignor to Young Brothers Company, Cleveland, Ohio, a corporation of Michigan
Filed Apr. 12, 1961, Ser. No. 102,544
12 Claims. (Cl. 198—202)

This invention relates generally, as indicated, to a conveyor belt control device and more particularly to a multi-belt feed table incorporating such device which maintains the belts taut and in contact with the drive and takeup rolls as well as properly spaced and guided.

In multi-belt feed tables used, for example, to transfer rectangular metal sheets over a horizontal surface between processes in a continuous metal decorating operation, the belts require to be maintained taut and in contact with the drive and takeup rolls as well as flat against the surface of the feed table. Additionally the individual belts require to be maintained properly spaced and guided and this relationship or parallelism must be maintained while they are in motion.

Maintenance at optimum of the above operating conditions is even more difficult when the feed table is of the telescopic type in which the tail pulley may be moved between an extended and retracted position to extend the conveying surface thereof.

In an effort to maintain the belts taut, a counterweighted arm assembly, freely pivoted at one end with a belt roller guide at the other end, may be employed to act against the inside of each belt loop. This not only keeps the belt taut, but should also desirably maintain it at the proper tension. However, in operation, due to unknown factors, the belt has been found to have a tendency to ride up and out of the roller guides and to bind against the counterweight arm. Continued binding with substantial pressure being exerted by the belt against the arm results in rapid wear of the belt and contamination of the metal sheets or the like being transported with worn belt materials. In addition, the binding of the belt against the arm results in a braking action causing the various belts to move at different speeds. Variation in belt speeds then turns and twists the metal sheets in directions other than parallel to the line of travel, resulting in improper delivery.

It is accordingly a principal object of the present invention to provide a conveyor belt control device for a multi-belt feed table which will apply proper tension to the individual belts without affecting their speed.

It is a further important object to provide a multibelt feed table in which all belts will track parallel and at the proper speed.

It is still another important object to provide a multi-belt feed table in which the belts individually may be set and controlled with positive action resulting in proper and trouble-free operation of the conveyor.

It is a further object to provide a conveyor belt control device which will serve properly to align such belt and which can be locked in position once proper adjustment is obtained.

It is a still further object to provide a conveyor belt aligner and tensioner where flexibility is obtained in the positioning of a belt roller guide located at the distal end of a pivotally mounted counterweight arm.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 4:
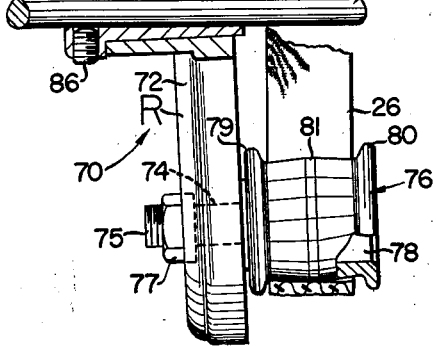

In said annexed drawings:
FIG. 1 is a fragmentary top plan view of the tail pulley end of a feed belt table assembly in accordance with the present invention;
FIG. 2 is a fragmentary vertical longitudinal section of such feed belt table assembly on a somewhat reduced scale;
FIG. 3 is a fragmentary longitudinal vertical section with the table in retracted position;
FIG. 4 is a fragmentary vertical section taken substantially on the line 4—4 of FIG. 1 on an enlarged scale showing the details of the conveyor belt control device;
FIG. 5 is a diagrammatic top plan view on an exaggerated scale illustrating the various positions obtainable with the conveyor belt control device of the present invention; and
FIG. 6 is a diagrammatic end elevation of the belt roller in its various positions of adjustment.

Referring now to said annexed drawings and more particularly to the multi-belt feed table disclosed in FIGS. 1, 2 and 3, such table may be employed automatically and continuously to transfer metal sheets or the like along the top surface thereof from a coating mechanism to the wickets of a baking oven conveyor. The illustrated multi-belt feed table is mounted on a pedestal 10 which is in turn mounted on a frame 11 supporting such pedestal on a concrete floor 12 or the like. Within the pedestal 10 there is provided a drive motor 13 mounted on a base 14 which is pivoted at 15 to a pair of brackets 16 mounted on bottom plate 17. A suitable V-belt drive 18 may be employed to drive a conveyor belt pulley 19 through sheave 20 coaxially mounted therewith.

Referring now more particularly to FIG. 1, a series of conveyor belts 21, 22, 23, 24, 25 and 26 are driven by such pulley and such belts pass around the drive pulley 19, idler pulley 30, then over extensible tail pulley 31, over the top of support pulley 32, and around fixed head pulley 33.

Secured to the sides of the table are two upstanding support plates 35 and 36 supporting the belts and belt pulleys in the proper vertical position. Such vertically extending support plates are bolted to the sides of the pedestal 10 as shown at 37 and elongated vertical slots 38 in such plates permit vertical adjustment theoreof. Longitudinally extending tubular support members 37 and 38 of generally square transverse section are secured to the inner top edges of such support plates. The tubular frame members 37 and 38 extend from the idler support pulley 32 in the direction of travel of the belts supporting the head pulley 33 fixed therebetween and beyond to be fastened directly to the coating oven frame which is to the right of the table as shown in FIG. 2 but not illustrated. The transverse frame member 39 may be employed to rigidify the longitudinally extending support members 37 and 38. Thus, the members 37, 38 and 39 form a frame mounted on the plates 35 and 36 supporting the idler pulley 32 and the head pulley 33.

An extensible frame supports tail pulley 31 and idler pulley 30 for movement to the extended and retracted positions shown in FIGS. 2 and 3 respectively. This extensible frame comprises longitudinally extending side members 40 and 41 of the same square sectional configuration as the side members 37 and 38 fixed to the side plates 35 and 36. Transverse frame members 42 and 43 serve to rigidify such extensible frame. Guides 44 mounted on the extensible frame on opposite sides thereof engage the frame members 37 and 38 and guides 45 and 46 mounted on the tubular frame members 37 and 38 cooperate with such guides 44 to support the extensible frame members 40 and 41 for longitudinal movement as indicated. As seen more clearly in FIG. 1, the bearings 47 and 48 for the idler pulley 32 are mounted on angle brackets 49 and 50 which bridge the longitudinal frame members 40 and 41.

It can now be seen that the drive pulley 19 is mounted for rotation between the upstanding plates 35 and 36; the idler pulley 30 is mounted for longitudinal movement with the extensible frame at the inner end thereof; the tail pulley 31 is also mounted on the extensible frame at the opposite or outer end thereof; the idler pulley 32 is stationarily mounted for rotation at the end of the fixed frame; and the head pulley 33 is mounted between the fixed frame members 37 and 38 at the opposite end thereof. In order to extend and retract the table, racks 60 may be provided mounted upon the undersides of the frame members 40 and 41 engaging pinions 61 mounted on shaft 62. Such shaft may be rotated by means of a crank at the side of the table thus to extend and retract the movable portion of the multi-belt feed table. It is noted that in the retracted position shown in FIG. 3, the belts 21 through 26 will contact the shaft 62 and be held out of engagement with the pulley 19 and belts trained thereabout. A belt supporting planar table top 63 is mounted on the immovable frame portion of the table and the top surface thereof is aligned with the upper surfaces of the tail pulley 31, the idler pulley 32 and the head pulley 33. The belts will then be supported by the tail pulley, the idler pulley, the table top and head pulley 33 and be in frictional sliding contact with the top of such table. The oven conveyor wickets will be positioned between the frame members 37 and 38 to the right of the head pulley, as shown in FIG. 2, and the coated sheets in the example illustrated will automatically be positioned thereon to be delivered to the baking oven. A limit switch 64 may be employed to actuate a signal indicating that the table is in its proper extended position.

In order to ensure that all belts 21 through 26 track parallel and at the same speed, there is provided for each individual belt a control device shown more particularly in FIGS. 1 and 4. As shown for the respective belts 21 through 26, there is provided an individual aligning and tensioning device 65, 66, 67, 68, 69 and 70, respectively. Since all of the counterweight arm aligners are substantially identical in form, only the control mechanism 70 will be described in detail. However, all of the control devices are essentially comprised of counterweight arms which are freely pivotally mounted at their proximal ends on transverse shaft 71 which is non-rotatably secured between extensible frame members 40 and 41. The distal end of each arm is provided with a belt contacting roller which engages the inner surface of the respective belt, keeping it under proper tension and maintaining it in proper alignment. The control device 70 includes a goosenecked elongated counterweight arm 72 preferably made of cast iron provided at its proximal end with a hub 73 and at its distal end with an aperture 74 for the mounting shaft 75 of belt roller guide 76. A longitudinally extending rib R may be provided extending substantially the length of the arm. The roller may be clamped to the arm by means of nut 77 threaded on shaft 75 and such roller is provided with suitable interior bearing means as shown at 78. The roll itself includes two circular side guide flanges 79 and 80, as shown, and the center of the roll may be crowned as shown at 81 with a one-sixteenth inch flat, for example. At its proximal end, the counterweight arm 72 is supported on the support shaft 71 by means of an eccentric bushing 83. The center of the bushing is provided with a throughbore 84 which closely fits the support shaft 71 and an annular shoulder 85 at one end of the bushing may be provided with a hex socket type set screw 86. The axis of the exterior right circular cylindrical surface 87 of the bushing is at a definite angle to the axis of the counterweight support shaft 71. Since the support shaft 71 will be substantially parallel to the head and tail pulleys 33 and 31, the bushing surface 87 will be at a substantial eccentric to such head and tail pulleys. The angle of eccentricity between the axis of the bore or counterweight support shaft 71 and the axis of the outer surface 87 is, in the illustrated embodiment, 1° and 25 minutes. It is noted that the bore in the hub 73 of the counterweight arm is normal to the counterweight arm and that the shaft 75 of the belt roller 76 is also normal to such arm. Therefore, the bore in the arm hub and the belt roller shaft will always be parallel and the degree of inclination of the guide roller with respect to the counterweight arm support shaft 71 and the belts trained about the pulleys will be depended upon the rotational position of the bushing 83 thereon. As the bushing is rotated about the shaft 71 through 360°, the counterweight arm will then be pivoted 1° and 25 minutes to either side of a center point or through a total angle of 2° and 50 minutes. It will, however, be understood that this is the preferred form for the particular size of multi-belt feeder conveyor shown and the amount of eccentricity is related to the range of travel of the tail pulley between its retracted and extended positions as to the feed table telescopes in and out. Thus with a larger size table having a greater extension than the one shown, the angle of eccentricity would be increased and vice versa.

If desired, collars 88 and 89 may be mounted on the shaft 71 to maintain the hub 73 of counterweight arm 72 on the bushing and also to maintain the bushing in its proper longitudinal position on the shaft 71, but such collars will not in any way preclude the free rotation of the hub on the exterior eccentric surface of the bushing 83.

Broadly, the axis of the draft on which bushing is mounted is fixed and parallel to the head shaft, etc. of the machine (e.g shaft roller 33). The outer surface of bushing 83 is cylindrical, but at a slight angle to such axis. Therefore, when the bushing rotates, it tilts the arm. Any axially extending line on outer surface of bushing describes a frusto-conical path or surface and this rocks the arm 72 laterally.

Referring now to the diagrammatic views of FIGS. 5 and 6 in addition to the FIG. 4 detail view, it will be seen that rotation of the aligner bushing 83 on the counterweight support shaft 71 changes the position of the pivot axis of the counterweight arm and also moves the counterweight assembly in a swinging motion about a point on the counterweight shaft 71 and this rotates the axis of the belt roller shaft 75 in a projected conical path as shown in FIG. 6 with the base of such cone being in the form of a flattened elipse 90. Thus, when the eccentric or throw of the bushing is directly on top of the shaft 71, the axis of roller shaft 75 will be tilted slightly upwardly at the same angle as that of the eccentric as shown at 91 (FIG. 6). Rotation of the eccentric portion of the bushing toward the viewer as seen in FIG. 4 will move the arm to the maximum angle position shown at 92. Further rotation of the eccentric will place the throw thereof at the bottom of the shaft to incline the arm and thus the axis of shaft 75 in the opposite direction with respect to shaft 71 as that seen in FIG. 4. The projection of the axis of shaft 75 will then be seen at 93 in FIG. 6. Further rotation of the eccentric bushing until the throw thereof is on the opposite or far side of the shaft 71 will pivot the counterweight arm to the position shown at 94 (FIG. 5). Here the axis of the belt roller will be in the same horizontal plane P (FIG. 6) as the axis in the position shown at 92 which is substantially parallel to the axis of support shaft 71. Continued rotation of the bushing through 90° will bring it back to the position shown in FIG. 4 and will complete the elliptical path of the projection of the axis of the shaft 75. In various positions of the belt roller guide, it can be seen that the force of the counterweight arm caused by its weight will be exerted at an angle to the normal belt center line as shown at 95 and 96. The force resulting from such tilt shown diagrammatically at 97 and 98 provides a resultant force shown at 99 and 100 effective to tend to shift the belt toward the respective controlled belt center lines shown at 101 and 102.

As seen in FIG. 4, the inclination of the shaft axis 75 will tend to shift the center line of the belt on the roller crown 81 which will tend laterally to shift the belt and will compensate for various belt irregularities. The radial swinging movement obtained as shown more clearly in FIG. 5 keeps the belt from rubbing against the arm as well as tending properly to position the belt with respect to the pulley. Since the counterweight arm is freely rotatable upon the bushing, there will always be substantially the same force exerted upon each belt which will maintain the belts under the proper tension which belts will then thus be driven at the required uniform speed.

Should the head and tail pulleys be slightly out of parallel even though the assembly is "square" within normal assembly tolerances, this would tend to cause the belts to move laterally toward the shorter path side of the assembly and this also would affect the relative belt velocities. Accordingly, with the belt control device shown, it is possible individually to set and control the several belts maintaining the belts properly spaced and the belt paths equal with positive action, resulting in proper and trouble-free operation of the multi-belt feed table. Since all that is required is the loosening or setting of the set screw 86 to rotate the eccentric bushing to place the counterweight arm in the position desired, it can be seen that each belt may readily individually be controlled by this device which not only maintains the belt under proper tension, but also ensures the proper tracking of the parallel belts.

Referring now to FIG. 1, the control devices 65 through 69 can be mounted so that the respective rollers 105, 106, 107, 108 and 109 extend from the opposite side of the respective arms 65 through 68. Only the space requirements on shaft 71 dictate the manner of assembling the counterweight arm aligner thereon.

It can now be seen that there has been provided a multi-belt feed table in which the individual belts will be properly spaced and guided and maintained in this relationship when the belts are in motion, as well as maintained taut to provide the proper contact with the drive and take-up rolls and the top surface of the table. Rotation of the bushing simultaneously swivels the axis of the belt contacting roller diagonally of the path of travel of the belt through the aforesaid arc, shifts the axis generally laterally of the belt, and tilts the angle of inclination of the axis of the roller with respect to the belt. Since the bushing can be locked in the desired position, the desired control over the belt can readily be obtained.

Other modes of applying the principle of the invention may be employed, change being made as regards the details described, provided the features stated in any of the following claims or the equivalent of such be employed.

I, therefore, particularly point out and distinctly claim as my invention:

1. In combination, a multi-belt feed table comprising right circular cylindrical belt pulleys having a plurality of belts trained thereabout, drive means for said belts; individual tensioning and guide means for each of said belts, said tensioning and guide means comprising an elongated freely pivotally mounted arm having a belt contacting guide roller having its axis of rotation extending generally transversely of said belt on the distal end of said arm, and means to vary the angle of the pivot axis of said arm with respect to the axes of said pulleys to position said belt contacting guide rollers in a plurality of adjusted positions.

2. The combination set forth in claim 1 wherein said multi-belt feed table is of the telescoping type wherein the top conveying surface thereof can be enlarged or contracted.

3. The combination set forth in claim 1 wherein said arm is goosenecked and is provided with a hub at the proximal end thereof with a right circular cylindrical bore therethrough and said belt contacting roller is provided at the distal end thereof laterally mounted thereon.

4. A belt control device comprising an elongated arm, support means for the proximal end of said arm comprising a transversely extending support shaft, eccentric means mounting said proximal end of said arm on said support shaft, and belt contacting means at the distal end of said arm adapted to be adjustably positioned by selective rotation of said eccentric means.

5. The combination set forth in claim 4 including means to lock said eccentric means in a selected position of adjustment.

6. A belt control device comprising an elongated arm, means freely to pivot the proximal end of said arm at a fixed position with respect to said belt, a belt contacting roller at the distal end of said arm, and eccentric means at the proximal end of said arm to adjust the angle of said roller with respect to said belt, and means to lock said roller in the selected position of adjustment.

7. In combination, a telescoping multi-belt feed table comprising a stationary frame having a head pulley and guide pulley thereon, a telescoping frame having a tail pulley and guide pulley thereon adapted to telescope within said stationary frame, a plurality of belts entrained about said pulleys, and means to drive said pulleys and thus said belts; individually adjustable tensioning and guide means for each of said belts comprising a non-rotatable shaft transversely of said belts mounted in said telescoping frame, counterweight arms freely pivotally mounted on said shaft, belt engaging and guide means at the distal end of each said arms adapted to engage the inside of a belt loop, the weight of such arm keeping each belt in proper tension, eccentric bushing means interposed between the proximal ends of said arms and said shaft, said bushing means having an external bearing surface for said arm, the axis of which is at an angle to the axis of said shaft, said arms being mounted on said ececntric bushings whereby rotation of said bushings will move said belt contacting rollers laterally with respect to said belts as well as to incline the axis of said rollers with respect to said belts, and means to lock said bushings in the selected rotational position to obtain the desired lateral position and the selected axis of inclination of said belt contacting rollers thus properly to guide said belts about said pulleys.

8. The combination set forth in claim 7 wherein said rollers are centrally crowned with a small flat portion and include side belt guiding flanges.

9. An endless belt control device comprising an elongated arm, means freely pivoting the proximal end of said arm at a fixed position with respect to said belt, a belt contacting roller at the distal end of said arm extending generally transversely of said belt, and means operative adjustably to vary the angle of the pivot axis of the proximal end of said arm with respect to said belt simultaneously to adjust the inclination of said roller with respect to said belt and the position of said roller transversely of said belt.

10. A device as set forth in claim 9 wherein said roller is crowned and includes guide flanges for said belt.

11. In combination, a multi-belt feed table comprising right circular cylindrical belt pulleys having a plurality of belts trained thereabout, drive means for said belts; individual tensioning and guide means for each of said belts, said tensioning and guide means comprising an elongated freely pivotally mounted arm having a belt contacting guide roller having its axis of rotation extending generally transversely of said belt on the distal end of said arm, means to vary the inclination of the pivot axis of said arm with respect to said belt to position said belt contacting guide rollers in a plurality of adjusted positions, the proximal end of said arm being mounted on a support shaft by means of an eccentric bushing, with means being provided adjustably to rotate said bushing about said support shaft and to lock said bushing in a selected postiion of adjustment.

12. In combination, a multi-belt feed table comprising right circular cylindrical belt pulleys having a plurality of belts trained thereabout, drive means for said belts; individual tensioning and guide means for each of said belts, said tensioning and guide means comprising an elongated freely pivotally mounted arm having a belt contacting guide roller having its axis of rotation extending generally transversely of said belt on the distal end of said arm, means to vary the inclination of the pivot axis of said arm with respect to said belt to position said belt contacting guide rollers in a plurality of adjusted positions, and including means operative to adjust the axis of said belt-contacting roller both vertically and laterally of said conveyor belt.

References Cited in the file of this patent
UNITED STATES PATENTS

| | | |
|---|---|---|
| 685,026 | Bell | Oct. 22, 1901 |
| 2,241,219 | Plausics | May 6, 1941 |
| 2,601,929 | Brichard | July 1, 1952 |